US006403198B1

(12) United States Patent
Urasaki

(10) Patent No.: US 6,403,198 B1
(45) Date of Patent: Jun. 11, 2002

(54) INK JET RECORDING MEDIUM

(75) Inventor: Jun Urasaki, Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 0 days.

(21) Appl. No.: 09/314,163

(22) Filed: May 19, 1999

(30) Foreign Application Priority Data

May 21, 1998 (JP) .......................................... 10-139747

(51) Int. Cl.[7] ................................................ B32B 27/14

(52) U.S. Cl. ....................... 428/195; 428/328; 428/329; 428/522

(58) Field of Search ................................ 428/195, 212, 428/328, 329, 522

(56) References Cited

U.S. PATENT DOCUMENTS

| | | | | | |
|---|---|---|---|---|---|
| 5,041,328 | A | * | 8/1991 | Akiya et al. | 428/195 |
| 5,472,757 | A | * | 12/1995 | Ogawa et al. | 428/195 |
| 5,662,997 | A | * | 9/1997 | Onishi et al. | 428/331 |
| 5,747,146 | A | * | 5/1998 | Kashiwazaki et al. | 428/195 |

FOREIGN PATENT DOCUMENTS

| | | |
|---|---|---|
| JP | 4-67986 | 3/1992 |
| JP | 4-309533 | 11/1992 |
| JP | 10-81064 | 3/1998 |

OTHER PUBLICATIONS

Abstract of Japanese Publication No. JP 0004067986 AA, Mar. 3, 1992, Kijimuta Hitoshim Asahi Glass Co. Ltd.

Abstract of Japanese Publication No. JP 0007137431 AA, May 30, 1995, Yoshida Yasumine, Mitsubishi Paper Mills Ltd.

* cited by examiner

*Primary Examiner*—Pamela R. Schwartz
(74) *Attorney, Agent, or Firm*—Armstrong, Westerman & Hattori, LLP

(57) ABSTRACT

The object of the present invention is to provide an ink jet recording medium which has an ink absorption layer comprising a coating solution containing an alumina hydrate and a water-soluble binder, said ink absorption layer being inhibited from formation of cracks at the drying step and said coating solution being excellent in stability with time. In the ink jet recording medium according to the present invention, the ink absorption layer contains an alumina hydrate and at least two kinds of polyvinyl alcohols differing in saponification degree.

3 Claims, No Drawings

INK JET RECORDING MEDIUM

BACKGROUND OF THE INVENTION

The present invention relates to recording media used for printers or plotters which utilize the ink jet recording system. Particularly, it relates to ink jet recording media having a gloss of photographic papers which is strongly demanded in the field of color recording and to recording media high in transparency and usable as OHP films.

With recent remarkable progress in ink jet printers or plotters, full-color and highly minute images can be easily obtained. Accordingly, development of ink jet recording media other than the conventional woodfree papers and coated papers is earnestly desired.

Ink jet recording system performs recording of images or letters by ejecting ink droplets according to various principles and absorbing them into recording media such as paper. Ink jet printers or plotters have the features that they are excellent in high-speed printability, produce little noise, are great in versatility of patterns to be recorded, and require no development-fixation step, and they are noticeable in that complicated images can be accurately and rapidly formed. Recently, the ink jet printers or plotters have rapidly spread in various uses, especially, as devices for making hard copies of image information such as letters and figures produced by computers. Furthermore, multicolor recording can be easily performed by using a plurality of ink nozzles. The multicolor ink jetting systems are not inferior in the resulting color images to the multicolor printing according to plate making systems or printing according to color photographic systems. Moreover, when a small number of prints are to be produced, they can produce the prints more cheaply than the printing techniques or photographic techniques.

Lately, cheap ink jet printers are commercially available which can output highly minute images equal to the images obtained by the silver salt photographic system. Ink jet recording media can give images of the same quality as those produced by silver salt photographic systems and, besides, they are very cheap. Therefore, the ink jet recording media provide economically a great merit for users who must change frequently the display images such as illumination signs or commercial samples which must have large areas. Moreover, recently, it becomes common to produce images on personal computers and correct the color arrangement or layout with observing the printout. Such is utterly impossible according to the conventional silver salt photographic systems while such operation can be readily performed by the ink jet recording, which is one of the merits of the ink jet recording systems.

The fields of utilization of ink jet printers or plotters which recently have especially been noticed are production of color block copies in the field of printing which requires image quality close to that of photographs, full-color image recording such as output of design images in the field of designing, and recording of image information produced by computers on transparent recording media by ink jet printers and utilizing the recorded information as films for OHP (overhead projectors) in presentation at a conference.

Owing to demands from the fields of utilization of ink jet printers or plotters and with spread of ink jet printers or plotters, demands for recording media are diversified, and, for example, there are demanded recording media having excellent appearance of high surface gloss equal to silver salt color photographs and recording media of high transparency usable as films for OHP.

As for the recording media used in the ink jet recording systems, efforts have been made from the side of apparatus or ink composition so that the general woodfree papers and coated papers for printing or writing can be used. However, with improvement in performances of ink jet recording apparatuses or expansion of uses, such as printing speed, minuteness of images, or full-color recording, ink jet recording media are also required to have the higher characteristics. These characteristics are as follows: inked dots have a high density and a light and clear color tone; ink is quickly absorbed into the recording media, and even when an inked dot overlaps another inked dot, the ink does not flow or blot; inked dots do not diffuse in lateral direction more than needed; and inked dots have smooth and distinct perimeter lines. Especially, in the case of color recording, not only the single color recording of yellow, magenta, cyan, and black, but also overlaying recording of these colors are carried out, and the amount of ink absorbed in the recording medium is further increased and, hence, very severe performances are required.

Ink jet recording media using alumina hydrates are proposed as those which are high in ink absorption speed and enhanced in transparency and glossiness. That is, ink jet recording media comprising a support on the surface of which an alumina hydrate is coated together with a water-soluble binder are disclosed, for example, in JP-A-60-232990, JP-A-60-245588, JP-B-3-24906, JP-A-2-276670, JP-A-3-215082, JP-A-4-37576, JP-A-4-67986, JP-A-5-16517, JP-A-5-24335, JP-A-5-32037, JP-A-5-50739, JP-A-5-286228, JP-A-5-301441, JP-A-6-48016, JP-A-6-55829, JP-A-6-183126, JP-A-6-184954, JP-A-6-199034, JP-A-6-199035, JP-A-6-218324, JP-A-6-255235, JP-A-6-262844, JP-A-6-270530, JP-A-6-286297, JP-A-6-297831, JP-A-6-297832, JP-A-6-316145, JP-A-7-68919, JP-A-7-68920, JP-A-7-76161, JP-A-7-76162, JP-A-7-82694, and JP-A-7-89221.

These ink jet recording media have an ink absorption layer comprising a porous alumina hydrate. The ink absorption layer comprising a porous alumina hydrate is composed of the alumina hydrate and a polyvinyl alcohol binder. However, the ink absorption layer comprising a porous alumina hydrate cracks at the time of drying due to the shrinkage of the alumina hydrate. Furthermore, a coating solution comprising an alumina hydrate and a polyvinyl alcohol binder is apt to increase in viscosity with time, and especially in the case of a coating solution which is high in solid concentration, the solution is inferior in handleability and the coating operation is difficult, and the operability in continuous coating is unsatisfactory.

For the inhibition of occurrence of cracks in the coat of the ink absorption layer comprising an alumina hydrate and a polyvinyl alcohol binder at the time of drying, JP-A-7-76161 proposes a method of inhibiting the cracking by improving strength of the coat by gelatinizing the polyvinyl alcohol binder with boric acid or a borate. However, the gelling reaction of polyvinyl alcohol and boric acid or a borate is very fast, and change in viscosity of the coating solution with time cannot be avoided and, hence, coating stability becomes inferior. Moreover, the gelling product causes streaking and, thus, results in deterioration of surface quality. JP-A-6-218324 proposes a method of coating the coating solution on a support and blowing ammonia gas to the coat before removal of solvent to gelatinize the coat. However, ammonia gas is not only highly corrosive, but also is explosive, and use of it is dangerous. Furthermore, excess ammonia gas must be recovered, and, thus, use of ammonia gas is not preferred from the points of operation and simplicity of equipment.

As a method for inhibiting increase of viscosity with time to improve stability of the coating solution with time, JP-A-4-67986 discloses a method of using a polyvinyl alcohol having a polymerization degree of 1000 or less as a binder and JP-A-4-309533 discloses a method of using a polyvinyl alcohol having a saponification degree of 50–90%.

According to these methods, the stability of the coating solution with time can be improved, but the improvement is still insufficient. Besides, even if the stability with time is excellent, cracks are apt to occur in the coat at the time of drying, and because of too low viscosity of the coating solution, film formability is inferior.

SUMMARY OF THE INVENTION

The object of the present invention is to provide an ink jet recording medium having an ink absorption layer which is inhibited from occurrence of cracks at the time of drying and comprises a coating solution containing an alumina hydrate and a water-soluble binder and excellent in stability with time.

The above object of the present invention has been attained by an ink jet recording medium which has an ink absorption layer comprising a coating solution containing an alumina hydrate and a polyvinyl alcohol, said polyvinyl alcohol comprising at least two polyvinyl alcohols differing in saponification degree.

It is preferred to use at least two kinds of polyvinyl alcohols selected from the group of polyvinyl alcohols having a saponification degree of 92% or higher and the group of polyvinyl alcohols having a saponification degree of 90% or lower.

More preferably, the polyvinyl alcohol having a saponification degree of 92% or higher has a polymerization degree of 2500 or lower and the polyvinyl alcohol having a saponification degree of 90% or lower has a polymerization degree of 2000 or higher. The term "polymerization degree" used in this specification means "viscosity-average polymerization degree".

Furthermore, it is preferred that content of the polyvinyl alcohol having a saponification degree of 92% or higher and content of the polyvinyl alcohol having a saponification degree of 90% or lower satisfies the following formula (1).

$$4 \leqq 100 \cdot W1/(W1+W2) \leqq 40 \quad (1)$$

W1: Content (g) of polyvinyl alcohol having a saponification degree of 92% or higher.

W2: Content (g) of polyvinyl alcohol having a saponification degree of 90% or lower.

DETAILED DESCRIPTION OF THE INVENTION

In the present invention, the alumina hydrates used may be any of those which can effectively absorb solvent and others contained in the ink when the coating solution is coated on a support to form a porous ink absorption layer. Especially preferred is an alumina sol having a pseudoboehmite structure.

When the ink absorption layer comprising an alumina hydrate has substantially such a porous structure that the pores have an average radius of 1–15 nm and the pore volume is 0.3–1 ml/g, the ink absorption layer has a sufficient ink absorbability and has transparency. Thus, such ink absorption layer is preferred. In this case, when the support is transparent, a transparent recording medium can be obtained. Even if the support is opaque, it is possible to obtain images of high quality which do not damage the texture of the support.

It is further preferred from the points of compatibility of fixability and transparency that the volume of pores having a radius in the range of the average pore radius ±1 nm of the ink absorption layer comprising the alumina hydrate is 45% or more of the total pore volume. More preferably, the average pore radius is 3–10 nm and the volume of pores having a radius in the range of the average pore radius ±1 nm is 55% or more of the total pore volume.

The ink absorption layer of the present invention preferably contains at least two kinds of polyvinyl alcohols selected from polyvinyl alcohols having a saponification degree of 92% or higher and selected from polyvinyl alcohols having a saponification degree of 90% or lower. The saponification degree here is a value measured by the method of JIS-K6726. Chemically, it is a proportion of the mol number of hydroxyl group produced by the saponification reaction when polyvinyl acetate is saponified to obtain polyvinyl alcohol.

The markedly effective inhibition of cracking of the coat and the high stability with time of the alumina hydrate coating solution in the present invention can be obtained by using polyvinyl alcohols different in saponification degree in combination. That is, a polyvinyl alcohol having a saponification degree of 92% or higher and a polyvinyl alcohol having a saponification degree of 90% or lower are used in combination. Preferably, at least one polyvinyl alcohol has a saponification degree of 92–97%, and at least one polyvinyl alcohol has a saponification degree of 85–90%.

When a polyvinyl alcohol of high saponification degree is used, cracks hardly occur at the time of drying in the ink absorption layer comprising alumina hydrate, while the coating solution gradually increases in viscosity and the coating operation becomes difficult. When a polyvinyl alcohol of relatively low saponification degree is used, the stability with time of the coating solution is improved while cracks are apt to occur in the ink absorption layer. These problems can be set off by using, in combination, polyvinyl alcohols different in saponification degree.

For further enhancement of the effect of the present invention, polymerization degree of the polyvinyl alcohol is connected with the saponification degree. It is preferred that the polyvinyl alcohol having a saponification degree of 92% or higher has a polymerization degree of 2500 or lower and the polyvinyl alcohol having a saponification degree of 90% or lower has a polymerization degree of 2000 or higher.

If the polymerization degree of the polyvinyl alcohol having a saponification degree of 92% or higher exceeds 2500, the viscosity which is stabilized at about room temperature of 30° C. or lower is high, and the coating operation becomes difficult. On the other hand, if the polymerization degree of the polyvinyl alcohol having a saponification degree of 90% or lower is lower than 2000, the film formability for the formation of the ink absorption layer is deteriorated.

The film formability of coating solution relates to fluidity of the solution, and when the coating solution is low in viscosity and high in fluidity, breakage of coating film still in liquid state occurs at the time of coating operation and cracking of the coating film occurs by the wind pressure of warm air of dryer at the time of drying.

Amount of the polyvinyl alcohols in total is 5–20% by weight based on the content of the alumina hydrate. If the amount of the polyvinyl alcohols is less than the above range, ink absorption layer cannot be formed, and if it is more than the above range, the ink absorbability given by the alumina hydrate is hindered.

Furthermore, when the relation of contents of the polyvinyl alcohol having a saponification degree of 92% or higher and the polyvinyl alcohol having a saponification degree of 90% or lower satisfies the following formula (1), especially,.the coating solution does not increase in viscosity at the coating stage and the coating operation is stabilized, and cracks are not formed in the ink absorption layer at the time of drying.

$$4 \leq 100 \cdot W1/(W1+W2) \leq 40 \quad (1)$$

W1: Content (g) of polyvinyl alcohol having a saponification degree of 92% or higher.

W2: Content (g) of polyvinyl alcohol having a saponification degree of 90% or lower.

If the above value is less than 4, the coating solution is stabilized at low viscosity and fluidity of the coating solution is high to deteriorate the film formability. On the other hand, if it exceeds 40, the coating solution is stabilized at high viscosity and the coating operation becomes difficult.

As the support used for preparing the ink jet recording media of the present invention, there may be mainly used, for example, polyester film, resin-coated paper and coated paper. However, there are no special limitations as far as the ink absorption layer can be provided thereon. Thus, glass, aluminum foil, metallized paper, metallized film, fabrics and clothes may also be used.

The ink absorption layer is provided on at least one side of the support, but may be provided on both sides for the inhibition of curling.

The ink absorption layer in the present invention can contain a crosslinking agent or a hardener for improving water resistance and mechanical strength of the ink absorption layer. Examples of the crosslinking agent and the hardener are glyoxal and derivatives thereof, urea and derivatives thereof, and melamine and derivatives thereof. Content of the crosslinking agent or hardener is 10–80%, preferably 20–60% based on the total amount of the polyvinyl alcohols.

Furthermore, the ink absorption layer may further contain known additives such as surface active agents, inorganic pigments, coloring dyes, coloring pigments, fixers for ink dyes, plasticizers for polyvinyl alcohol, ultraviolet absorbers, antioxidants, dispersants for pigments, antifoaming agents, leveling agents, preservatives, fluorescent brighteners, viscosity stabilizers, and pH adjustors.

For coating the coating solution to form the ink absorption layer, there may be employed conventional coating methods such as slide hopper coating method, curtain coating method, extrusion coating method, air knife coating method, roll coating method, and rod bar coating method.

An anchoring layer may be provided on the support in the present invention for improving adhesion between the ink absorption layer and the support. The anchoring layer can contain, in optional combinations, hydrophilic binders such as gelatin, solvent-soluble binders such as butyral resins, latexes, curing agents, pigments, surface active agents, and the like.

Moreover, various back coat layers can be coated on the support for giving antistatic properties, feed ability, anticurl properties, writability and sizability. The back coat layer may contain, in suitable combinations, inorganic antistatic agents, organic antistatic agents, hydrophilic binders, latexes, curing agents, pigments, lubricants, surface active agents, and the like.

DESCRIPTION OF THE PREFERRED EMBODIMENTS

The present invention will be explained in detail by the following examples, which never limit the invention.

Preparation of Alumina Hydrate:

An example of preparation of alumina hydrate used in the ink absorption layer will be shown below. The starting materials used were all commercially available ones and used, as they were, without subjecting to purification.

1200 Grams of deionized water and 900 g of isopropyl alcohol were charged in a 3 liter reaction vessel and heated to 75° C. Thereto was added 408 g of aluminum isopropoxide, followed by carrying out hydrolysis at 75° C. for 24 hours and at 95° C. for 5 hours. Thereafter, 24 g of acetic acid was added, followed by stirring at 75° C. for 48 hours and then concentrating so as to give a concentration of 25% by weight to obtain a dispersion of white alumina hydrate.

This sol was dried at room temperature and subjected to measurement of X-ray diffraction to show pseudoboehmite structure. The average particle diameter was measured by a transmission type electron microscope to obtain 40 nm. The average pore radius was measured by mercury penetration method to obtain 5.8 nm. The pore volume of pores having a radius of 4.8–6.8 nm was about 58% of the total pore volume from exponential volumetric pore distribution.

Preparation of a Coating Solution Comprising an Alumina Hydrate and a Polyvinyl Alcohol:

EXAMPLE 1

100 Parts of the alumina sol dispersion prepared by the above process was mixed with 2 parts of a 15 wt % aqueous solution of PVA624 (polyvinyl alcohol manufactured by Kuraray Co., Ltd.; saponification degree: 93% and polymerization degree: 2400) and 15 parts of a 15 wt % aqueous solution of PVA235 (polyvinyl alcohol manufactured by Kuraray Co., Ltd.; saponification degree: 88% and polymerization degree: 3500). The mixture was stirred for 20 minutes and filtered by a filter of 200 mesh to obtain a coating solution.

EXAMPLE 2

The procedure of Example 1 was repeated, except that the alumina hydrate was mixed with 2 parts of a 15 wt % aqueous solution of PVA117 (polyvinyl alcohol manufactured by Kuraray Co., Ltd.; saponification degree: 99% and polymerization degree: 1700) and 15 parts of a 15 wt % aqueous solution of PVA210 (polyvinyl alcohol manufactured by Kuraray Co., Ltd.; saponification degree: 88% and polymerization degree: 2100).

EXAMPLE 3

The procedure of Example 1 was repeated, except that the alumina hydrate was mixed with 2 parts of a 15 wt % aqueous solution of PVA124 (polyvinyl alcohol manufactured by Kuraray Co., Ltd.; saponification degree: 99% and polymerization degree: 2400) and 15 parts of a 15 wt % aqueous solution of PVA224 (polyvinyl alcohol manufactured by Kuraray Co., Ltd.; saponification degree: 88% and polymerization degree: 2400).

EXAMPLE 4

The procedure of Example 1 was repeated, except that the alumina hydrate was mixed with 2 parts of a 15 wt % aqueous solution of PVA635 (polyvinyl alcohol manufactured by Kuraray Co., Ltd.; saponification degree: 93% and polymerization degree: 3500) and 15 parts of a 15 wt % aqueous solution of PVA235 (polyvinyl alcohol manufactured by Kuraray Co., Ltd.; saponification degree: 88% and polymerization degree: 3500).

EXAMPLE 5

The procedure of Example 1 was repeated, except that the alumina hydrate was mixed with 2 parts of a 15 wt % aqueous solution of PVA635 (polyvinyl alcohol manufactured by Kuraray Co., Ltd.; saponification degree: 93% and polymerization degree: 3500) and 15 parts of a 15 wt % aqueous solution of PVA217 (polyvinyl alcohol manufactured by Kuraray Co., Ltd.; saponification degree: 88% and polymerization degree: 1700).

EXAMPLE 6

The procedure of Example 1 was repeated, except that the alumina hydrate was mixed with 2 parts of a 15 wt % aqueous solution of PVA117 (polyvinyl alcohol manufactured by Kuraray Co., Ltd.; saponification degree: 99% and polymerization degree: 1700) and 15 parts of a 15 wt % aqueous solution of PVA217 (polyvinyl alcohol manufactured by Kuraray Co., Ltd.; saponification degree: 88% and polymerization degree: 1700).

EXAMPLE 7

The procedure of Example 1 was repeated, except that the alumina hydrate was mixed with 0.7 part of a 15 wt % aqueous solution of PVA624 (polyvinyl alcohol manufactured by Kuraray Co., Ltd.; saponification degree: 93% and polymerization degree: 2400) and 16.3 parts of a 15 wt % aqueous solution of PVA235 (polyvinyl alcohol manufactured by Kuraray Co., Ltd.; saponification degree: 88% and polymerization degree: 3500).

EXAMPLE 8

The procedure of Example 1 was repeated, except that the alumina hydrate was mixed with 6.5 parts of a 15 wt % aqueous solution of PVA624 (polyvinyl alcohol manufactured by Kuraray Co., Ltd.; saponification degree: 93% and polymerization degree: 2400) and 10.5 parts of a 15 wt % aqueous solution of PVA235 (polyvinyl alcohol manufactured by Kuraray Co., Ltd.; saponification degree: 88% and polymerization degree: 3500).

EXAMPLE 9

The procedure of Example 1 was repeated, except that the alumina hydrate was mixed with 0.5 part of a 15 wt % aqueous solution of PVA624 (polyvinyl alcohol manufactured by Kuraray Co., Ltd.; saponification degree: 93% and polymerization degree: 2400) and 16.5 parts of a 15 wt % aqueous solution of PVA235 (polyvinyl alcohol manufactured by Kuraray Co., Ltd.; saponification degree: 88% and polymerization degree: 3500).

EXAMPLE 10

The procedure of Example 1 was repeated, except that the alumina hydrate was mixed with 7 parts of a 15 wt % aqueous solution of PVA624 (polyvinyl alcohol manufactured by Kuraray Co., Ltd.; saponification degree: 93% and polymerization degree: 2400) and 10 parts of a 15 wt % aqueous solution of PVA235 (polyvinyl alcohol manufactured by Kuraray Co., Ltd.; saponification degree: 88% and polymerization degree: 3500).

COMPARATIVE EXAMPLE 1

The procedure of Example 1 was repeated, except that the alumina hydrate was mixed with 17 parts of a 15 wt % aqueous solution of PVA624 (polyvinyl alcohol manufactured by Kuraray Co., Ltd.; saponification degree: 93% and polymerization degree: 2400).

COMPARATIVE EXAMPLE 2

The procedure of Example 1 was repeated, except that the alumina hydrate was mixed with 17 parts of a 15 wt % aqueous solution of PVA117 (polyvinyl alcohol manufactured by Kuraray Co., Ltd.; saponification degree: 99% and polymerization degree: 1700).

COMPARATIVE EXAMPLE 3

The procedure of Example 1 was repeated, except that the alumina hydrate was mixed with 17 parts of a 15 wt % aqueous solution of PVA235 (polyvinyl alcohol manufactured by Kuraray Co., Ltd.; saponification degree: 88% and polymerization degree: 2300).

COMPARATIVE EXAMPLE 4

The procedure of Example 1 was repeated, except that the alumina hydrate was mixed with 17 parts of a 15 wt % aqueous solution of PVA217 (polyvinyl alcohol manufactured by Kuraray Co., Ltd.; saponification degree: 88% and polymerization degree: 1700).

The stability of the coating solution with time was evaluated by comparing the viscosity just after the preparation of the coating solution with the viscosity after lapse of 2 days from the preparation of the coating solution. The viscosity was measured using a Brookfield type viscometer under the conditions of No.3 rotor, 60 rpm and 25° C.

The coating solution was coated on a polyester film of B4 in size at a given coating amount of 35 g/m$^2$ using a wire bar. Then, the coated film was dried by leaving it at 90° C. for 15 minutes.

Cracking of the coat was examined by cutting the coated film to squares of 10 cm×10 cm and counting the number of cracks formed on the surface of the coat. When the number of cracks was less than 5, this is indicated by A; when the number was 5 or more and less than 10, this is indicated by B; when the number was 10 or more and less than 30, this is indicated by C; and when the number was 30 or more, this is indicated by D.

TABLE 1

| | Viscosity of coating solution (Pa · s) | | |
|---|---|---|---|
| | Just after preparation | After 2 days | Cracks |
| Example 1 | 20 | 20 | A |
| Example 2 | 20 | 21 | A |
| Example 3 | 20 | 20 | A |
| Example 4 | 30 | 33 | A |
| Example 5 | 27 | 31 | A |
| Example 6 | 20 | 20 | B |
| Example 7 | 18 | 18 | B |
| Example 8 | 29 | 33 | A |
| Example 9 | 18 | 18 | B |
| Example 10 | 33 | 33 | A |
| Comparative Example 1 | 23 | 45 | A |
| Comparative Example 2 | 24 | 43 | B |
| Comparative Example 3 | 12 | 15 | C |
| Comparative Example 4 | 11 | 13 | D |

As can be seen from Table 1, viscosity of the coating solution could be stabilized at a value suitable for coating and occurrence of cracks could be inhibited by combining polyvinyl alcohols differing in saponification degree. Especially when polymerization degree of the polyvinyl alcohol of the higher saponification degree was 2500 or lower and polymerization degree of the polyvinyl alcohol of the lower saponification degree was 2000 or higher, good results were obtained, and, furthermore, when ratio of the contents of the polyvinyl alcohol of the higher saponification degree and the polyvinyl alcohol of the lower saponification degree was within a specific range, excellent results were obtained.

Moreover, although Table 1 does not mention, when viscosity of the coating solution exceeded 40 Pa·s, marks of the wire mesh were left on the coat. On the other hand, when the viscosity was less than 15 Pa·s, there occurred a phenomenon of the coat being broken by the wind pressure of warm air in the dryer.

As explained above, according to the present invention, the viscosity of the coating solution can be stabilized in a range suitable for coating, and, besides, occurrence of cracks on the coat can be inhibited.

What is claimed is:

1. An inkjet recording medium comprising a support and, provided thereon, an ink absorption layer wherein the ink absorption layer contains an alumina hydrate and a polyvinyl alcohol, and said polyvinyl alcohol comprises at least two polyvinyl alcohols differing in saponification degree;

wherein one of the polyvinyl alcohols has a saponification degree of 92% or higher and another has a saponification degree of 90% or lower.

2. An ink jet recording medium according to claim 1, wherein the polyvinyl alcohol having a saponification degree of 92% or higher has a viscosity-average polymerization degree of 2500 or lower and the polyvinyl alcohol having a saponification degree of 90% or lower has a viscosity-average polymerization degree of 2000 or higher.

3. An ink jet recording medium according to claim 1, wherein the relation between the content of the polyvinyl alcohol having a saponification degree of 92% or higher and the content of the polyvinyl alcohol having a saponification degree of 90% or lower satisfies the following formula (1):

$$4 \leqq 100 \cdot W1/(W1+W2) \leqq 40 \quad (1)$$

in which W1 denote the content (g) of the polyvinyl alcohol having a saponification degree of 92% or higher and W2 denotes the content (g) of the polyvinyl alcohol having a saponification degree of 90% or lower.

* * * * *